United States Patent
Kang et al.

(10) Patent No.: US 9,632,360 B2
(45) Date of Patent: Apr. 25, 2017

(54) LIQUID CRYSTAL PANEL AND LIQUID CRYSTAL DISPLAY

(71) Applicant: Shenzhen China Star Optoelectronics Technology Co., Ltd., Shenzhen, Guangdong (CN)

(72) Inventors: Chih-tsung Kang, Guangdong (CN); Bo Hai, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 18 days.

(21) Appl. No.: 14/938,902

(22) Filed: Nov. 12, 2015

(65) Prior Publication Data
US 2016/0062167 A1 Mar. 3, 2016

Related U.S. Application Data

(62) Division of application No. 13/981,100, filed on Jul. 23, 2013, now Pat. No. 9,213,200.

(51) Int. Cl.
*G02F 1/13363* (2006.01)
*G02F 1/1335* (2006.01)

(52) U.S. Cl.
CPC .... *G02F 1/13363* (2013.01); *G02F 1/133528* (2013.01); *G02F 2001/133531* (2013.01); *G02F 2001/133638* (2013.01); *G02F 2413/02* (2013.01); *G02F 2413/03* (2013.01); *G02F 2413/05* (2013.01); *G02F 2413/06* (2013.01); *G02F 2413/12* (2013.01)

(58) Field of Classification Search
CPC ............... G02F 1/1335; G02F 1/13363; G02F 1/133528; G02F 2001/133638; G02F 2001/133531; G02F 2001/13363; G02F 2001/133635; G02F 2413/06; G02F 2413/12; G02B 1/08; G02B 5/3083
USPC ............................ 349/96, 102, 119, 117, 118
See application file for complete search history.

(56) References Cited

U.S. PATENT DOCUMENTS

2005/0030447 A1* 2/2005 Hsu ...................... G02F 1/13363
349/102

* cited by examiner

*Primary Examiner* — Thoi Duong
(74) *Attorney, Agent, or Firm* — Andrew C. Cheng

(57) ABSTRACT

A liquid crystal panel and a liquid crystal display are disclosed. The liquid crystal display includes a liquid crystal cell having a light incident side and a light emitting side, a first polarizer arranged on the light incident side of the liquid crystal panel, a second polarizer arranged on the light emitting side of the liquid crystal panel, and a half wave plate arranged between the first polarizer and the liquid crystal cell. An absorbing axis of the first polarizer is parallel to the absorbing axis of the second polarizer, and an angle between a slow axis of the half wave plate and the absorbing axis of the first polarizer is 45 or 135 degrees. In this way, the liquid crystal display with the two polarizers parallel to each other can be in all-black state when no voltage is applied. In addition, the contrast is greatly enhanced.

14 Claims, 6 Drawing Sheets

LIQUID CRYSTAL PANEL AND LIQUID CRYSTAL DISPLAY

CROSS REFERENCE TO RELATED APPLICATIONS

This is a divisional application of co-pending U.S. patent application Ser. No. 13/981,100, filed on Jul. 23, 2013.

BACKGROUND OF THE INVENTION

1. Field of the Invention

The present disclosure relates to liquid crystal display technology, and more particularly to a liquid crystal panel and a liquid crystal display (LCD).

2. The Related Arts

In LCDs, polarizers absorbs the lights orthogonal to the polarized axis, and only allows the lights radiating along the polarized axis to pass through such that the lights are converted to be polarized beams.

Vertical alignment (VA) mode relates to the alignment of the liquid crystal orthogonal to a substrate. The VA-mode LCDs are generally characterized by attributes such as a wide viewing angle, high contrast, and no need to perform rubbing alignment. As such, VA-mode is usually adopted for the large scale LCDs.

When the voltage is not applied, incident lights passing through the VA-mode liquid crystal cell are not deviated, and thus the orientations of the absorbing axis of the up polarizer and the down polarizer, i.e., that are orthogonal or parallel to each other, determine whether the LCD is in all-black state or in all-white. As shown in FIGS. 1a and 1b, the LCD is in the all-white state while the absorbing axis of the up polarizer and the down polarizer are parallel, and the LCD is in the all-black state while the absorbing axis of the up polarizer and the down polarizer are orthogonal.

Generally, while the voltage is not applied, the LCD is in the all-black state. As such, the brightness is low in the dark state and the contrast is enhanced. In addition, if one pixel is damaged in such state, only a dark pixel is shown, which causes less effect to the display performance.

However, in the large-scale LCD manufacturing process, the dimension of the liquid crystal panel is larger than the width of the coiled polarizer material. The coiled polarized material cannot be cut to manufacture the polarizer with the same size. Thus, the large-scale LCD cannot be in the all-black state under typical configuration.

Another solution is to vertically splicing the up and down polarizers. However, the spliced portion may result in a bright line, which is not acceptable for the LCDs.

SUMMARY OF THE INVENTION

The object of the invention is to provide a liquid crystal panel including two parallel-spliced polarizers, and the liquid crystal panel may be in the all-black state when no voltage is applied.

In one aspect, a liquid crystal panel includes: a liquid crystal cell comprising a light incident side and a light emitting side; a first polarizer arranged on the light incident side of the liquid crystal panel; a second polarizer arranged on the light emitting side of the liquid crystal panel; a half wave plate arranged between the first polarizer and the liquid crystal cell; and wherein an absorbing axis of the first polarizer is parallel to the absorbing axis of the second polarizer, and an angle between a slow axis of the half wave plate and the absorbing axis of the first polarizer is 45 degrees.

Wherein the liquid crystal panel further includes two bi-axial compensation films arranged respectively between the first polarizer and the liquid crystal cell and between the half wave plate and the liquid crystal cell.

Wherein when the angle between the slow axis of the bi-axial compensation film and the absorbing axis of the polarizer on the same side is 90 degrees, a central point brightness decreases and then increases in accordance with the increase of the compensation value at a predetermined wavelength.

Wherein the central point of the liquid crystal panel has a minimum brightness when the compensation value of the half wave plate equals to half of the predetermined wavelength.

Wherein when the angle between the slow axis of the bi-axial compensation film and the absorbing axis of the polarizer on the same side is 45 degrees, a central point brightness decreases and then increases in accordance with the increase of the sum of the compensation value of the half wave plate and the compensation value of the bi-axial compensation films at a predetermined wavelength.

Wherein when the angle between the slow axis of the bi-axial compensation film and the absorbing axis of the polarizer on the same side is 135 degrees, a central point brightness decreases and then increases in accordance with the increase of the sum of the compensation value of the half wave plate and the compensation value of the bi-axial compensation films at a predetermined wavelength.

Wherein the central point of the liquid crystal panel has the minimum brightness when the sum of the compensation value of the half wave plate and the compensation value of the bi-axial compensation films at the predetermined wavelength equals to half of the predetermined wavelength.

Wherein the predetermined wavelength is of the range from 380 nm to 780 nm.

Wherein the predetermined wavelength is of the range from 450 nm 650 nm.

In another aspect, a liquid crystal panel includes: a liquid crystal cell comprising a light incident side and a light emitting side; a first polarizer arranged on the light incident side of the liquid crystal panel; a second polarizer arranged on the light emitting side of the liquid crystal panel; a half wave plate arranged between the first polarizer and the liquid crystal cell; and wherein an absorbing axis of the first polarizer is parallel to the absorbing axis of the second polarizer, and an angle between a slow axis of the half wave plate and the absorbing axis of the first polarizer is 135 degrees.

Wherein the liquid crystal panel further includes two bi-axial compensation films arranged respectively between the first polarizer and the liquid crystal cell and between the half wave plate and the liquid crystal cell.

Wherein when the angle between the slow axis of the bi-axial compensation film and the absorbing axis of the polarizer on the same side is 90 degrees, a central point brightness decreases and then increases in accordance with the increase of the compensation value at a predetermined wavelength.

Wherein the central point of the liquid crystal panel has the minimum brightness when the compensation value of the half wave plate equals to half of the predetermined wavelength.

Wherein when the angle between the slow axis of the bi-axial compensation film and the absorbing axis of the polarizer on the same side is 45 degrees, a central point brightness decreases and then increases in accordance with the increase of the sum of the compensation value of the half wave plate and the compensation value of the bi-axial compensation films at a predetermined wavelength.

Wherein when the angle between the slow axis of the bi-axial compensation film and the absorbing axis of the polarizer on the same side is 135 degrees, a central point brightness decreases and then increases in accordance with the increase of the sum of the compensation value of the half wave plate and the compensation value of the bi-axial compensation films at a predetermined wavelength.

Wherein the central point of the liquid crystal panel has the minimum brightness when the sum of the compensation value of the half wave plate and the compensation value of the bi-axial compensation films at the predetermined wavelength equals to half of the predetermined wavelength.

Wherein the predetermined wavelength is of the range from 380 nm to 780 nm.

Wherein the predetermined wavelength is of the range from 450 nm 650 nm.

In another aspect, a liquid crystal display includes: a liquid crystal display and a backlight module opposite to the liquid crystal display, the backlight module supplies lights to the liquid crystal panel, and wherein the liquid crystal panel includes: a liquid crystal cell comprising a light incident side and a light emitting side; a first polarizer arranged on the light incident side of the liquid crystal panel; a second polarizer arranged on the light emitting side of the liquid crystal panel; a half wave plate arranged between the first polarizer and the liquid crystal cell; and wherein an absorbing axis of the first polarizer is parallel to the absorbing axis of the second polarizer, and an angle between a slow axis of the half wave plate and the absorbing axis of the first polarizer is 45 degrees.

In another aspect, a liquid crystal display include: a liquid crystal display and a backlight module opposite to the liquid crystal display, the backlight module supplies lights to the liquid crystal panel, and wherein the liquid crystal panel includes: a liquid crystal cell comprising a light incident side and a light emitting side; a first polarizer arranged on the light incident side of the liquid crystal panel; a second polarizer arranged on the light emitting side of the liquid crystal panel; a half wave plate arranged between the first polarizer and the liquid crystal cell; and wherein an absorbing axis of the first polarizer is parallel to the absorbing axis of the second polarizer, and an angle between a slow axis of the half wave plate and the absorbing axis of the first polarizer is 135 degrees.

DETAILED DESCRIPTION OF THE PREFERRED EMBODIMENTS

Embodiments of the invention will now be described more fully hereinafter with reference to the accompanying drawings, in which embodiments of the invention are shown.

Figure 2:
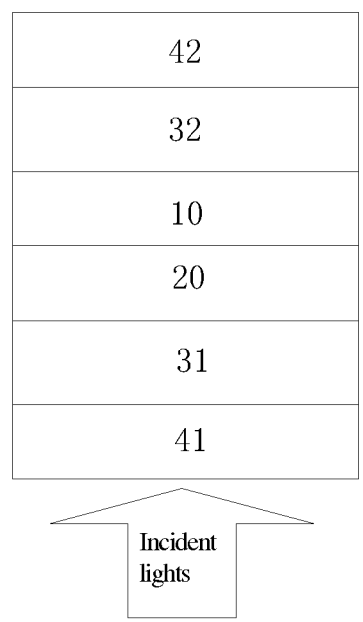
FIG. 2 is a schematic view of the liquid crystal panel in the all-black state in accordance with one embodiment.

FIG. 2 is a schematic view of the liquid crystal panel in the all-black state in accordance with one embodiment.

The liquid crystal panel includes a liquid crystal cell 10, a half wave plate 20, two bi-axial compensation films 31, 32, a first polarizer 41, and a second polarizer 42.

The liquid crystal cell 10 has VA display mode and includes liquid crystal. The liquid crystal cell 10 includes a light incident side and a light emitting side.

The first polarizer 41 is arranged on the light incident side of the liquid crystal cell 10, and the second polarizer 42 is arranged on the light emitting side of the liquid crystal cell 10. It can be understood that the locations of the first polarizer 41 and the second polarizer 42 may be switched. The polarizer 42 may be switched. The absorbing axis of the first polarizer 41 is parallel to that of the second polarizer 42.

The half wave plate 20 is arranged between the first polarizer 41 and the liquid crystal cell 10. The half wave plate 20 may be replaced by other component capable of generating the phase difference of 180 degrees or generating the optical phase difference equaling to one-half wavelength.

The bi-axial compensation film 31 is between the half wave plate 20 and the first polarizer 41. The bi-axial compensation film 32 is between the second polarizer 42 and the liquid crystal cell 10. It can be understood that the locations of the bi-axial compensation films 31, 32 can be switched.

In one embodiment, the bi-axial compensation films 31, 32 are for correcting the phase shift occurring in different viewing angles such that the birefringence of the liquid crystal are symmetrically compensated. The light leakage and the color shift for large-scale LCDs may be greatly enhanced. In other embodiments, the liquid crystal panel may not include the bi-axial compensation films 31, 32.

To keep the liquid crystal panel in the all-black state while no voltage is applied, proper parameters of the half wave plate 20 and the angle between the slow axis of the half wave plate 20 and the absorbing axis of the first polarizer 41 are needed. In addition, the parameters for the bi-axial compensation films 31, 32 and the angle formed respectively by the slow axis of the bi-axial compensation films 31, 32 and the first polarizers 41, 42 have to be found.

The software "LCD Master" is adopted to perform corresponding simulation. The pretilt angle equals to 89 degrees. Each of the pixels in the liquid crystal cell 10 is divided into four domains, and axial angles of the four domains are 45, 135, 225, and 315 degrees.

Blue-YAG LED light spectrum is adopted as the light source. The central point brightness is defined as 100 nit. The light distribution is Lambert's distribution.

The term "dark-state brightness" refers to the brightness when no voltage (0V) is applied to the liquid crystal cell 10. The term "bright-state brightness" refers to the brightness when the voltage (7V) is applied to the liquid crystal cell 10.

The dark-state brightness and the bright-state brightness are measured in units of nit. The contrast refers to the ratio between bright-state brightness and bark-state brightness.

Figure 1A:
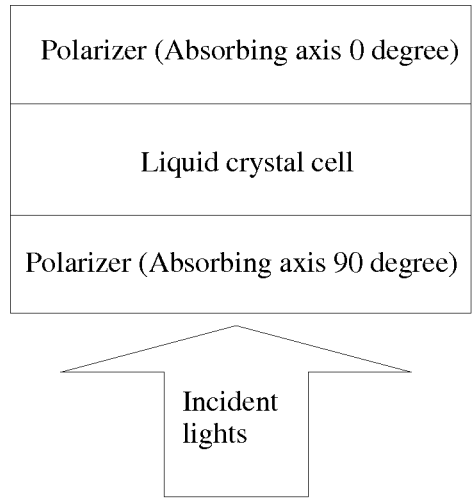
FIGS. 1a and 1b are schematic views of the liquid crystal panel in all-black state and in all-white state when no voltage is applied.
Figure 1B:
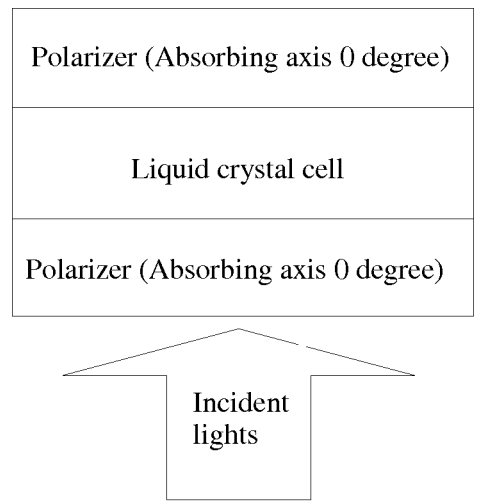

Table 1 shows the dark-state brightness, bright-state brightness and the contrast of the liquid crystal panel in all-black state in FIG. 1.

TABLE 1

| 0 V dark-state brightness | 7 V bright-state brightness | contrast |
|---|---|---|
| 0.019966 | 34.348 | 1720 |

Table 2 shows the parameters of the half wave plate 20 when the wavelength equals to 450, 550, 650 nm.

TABLE 2

| | parameters of half wave plate 20 | |
| wavelength | Nx | Ny |
|---|---|---|
| 450 nm | 1.54921 | 1.54098 |
| 550 nm | 1.54089 | 1.53270 |
| 650 nm | 1.53610 | 1.52797 |

As shown in Table 2, Nx represents the reflective rate of the x-axis of the half wave plate 20, Ny represents the reflective rate of the y-axis of the half wave plate 20, d represents the thickness of the half wave plate 20, and R0 represents the compensation value of the half wave plate 20 at a predetermined wavelength. Equation (1) is satisfied.

$$R0=(Nx-Ny)\times d \qquad (1)$$

It can be seen from Equation (1) that the compensation value of the half wave plate 20 at the predetermined wavelength may be adjusted by adjusting the thickness (d) or the reflective rate Nx, Ny.

Table 3 shows the simulation results of different conditions, such as the liquid crystal panel is in all-black state when no voltage is applied, and the liquid crystal panel is in all-white state when the voltage is applied. The angle respectively between the bi-axial compensation films 31, 32 and the absorbing axis of the first polarizer 41, the second polarizer 42 is 90 degrees.

TABLE 3

| | 0 V dark-state brightness | 7 V bright-state brightness | contrast |
|---|---|---|---|
| angle between slow axis of half wave plate 20 and absorbing axis of first polarizer 41 being 45 or 135 degrees | 0.4885 | 34.3 | 70 |
| slow axis of half wave plate 20 parallel to or vertical to absorbing axis of first polarizer 41 | 35.43 | 0.915 | 39 |

As shown in Table 3, when the slow axis of the half wave plate 20 is parallel to or vertical to the absorbing axis of the first polarizer 41, the liquid crystal panel is in all-white state when no voltage is applied. When the angle between the slow axis of the half wave plate 20 and the first polarizer 41 is 45 or 135 degrees, the liquid crystal panel is in all-black state when no voltage is applied. When no voltage is applied, the dark-sate brightness of the liquid crystal panel is high, and the contrast is low. Thus, the parameters of the half wave plate 20 have to be adjusted to reduce the dark-state brightness.

The incident lights with wavelength equaling to 450, 550, and 650 nm are simulated to obtain the results as shown in Table 1. As the reflective rate Nx, Ny of the half wave plate 20 at the predetermined wavelength are fixed, thus only the compensation value R0 can be adjusted, that is, changing the thickness (d) of the half wave plate 20. Below are two solutions for simulating the compensation values R0 of the half wave plate 20.

In solution 1, the angle between the slow axis of the half wave plate 20 and the absorbing axis of the first polarizer 41 is 45 or 135 degrees. The angle between the slow axis of the bi-axial compensation film 31 and the absorbing axis of the first polarizer 41 is 90 degrees. The angle between the slow axis of the bi-axial compensation film 32 and the absorbing axis of the second polarizer 42 is 90 degrees. The sum of the compensation value R0 of the bi-axial compensation films 31, 32 is 112 nm. The compensation R0 of the half wave plate 20 is adjusted to simulate the trend of the central point brightness of the liquid crystal panel.

In solution 2, the angle between the slow axis of the half wave plate 20 and the absorbing axis of the first polarizer 41 is 45 or 135 degrees. The angle between the slow axis of the bi-axial compensation film 31 and the absorbing axis of the first polarizer 41 is 45 or 135 degrees. The angle between the slow axis of the bi-axial compensation film 32 and the absorbing axis of the second polarizer 42 is 45 or 135 degrees. The sum of the compensation value R0 of the bi-axial compensation films 31, 32 is 112 nm. The compensation R0 of the half wave plate 20 is adjusted to simulate the trend of the central point brightness of the liquid crystal panel.

Figure 3:
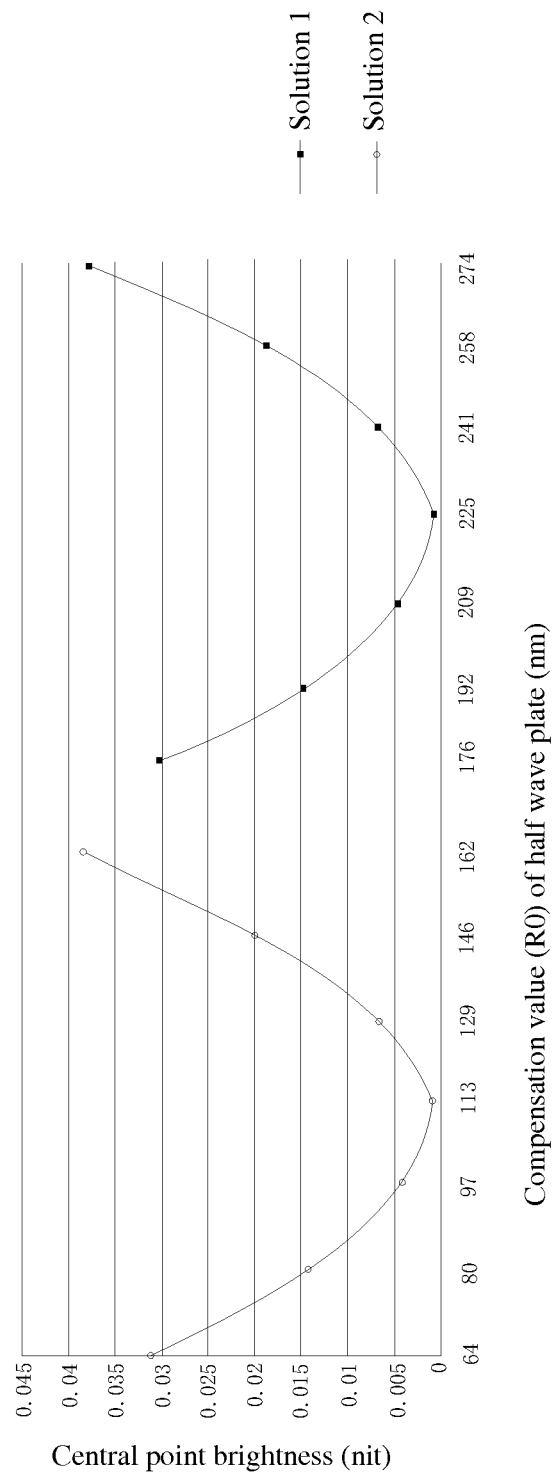
FIG. 3 is a trend view chart showing the central point brightness associated with the compensation value of the half wave plate when the wavelength equaling to 450 nm.

FIG. 3 is a trend view chart showing the central point brightness associated with the compensation value of the half wave plate when the wavelength equaling to 450 nm.

As shown in FIG. 3, the above solution 1 concludes that when the angle between the slow axis of the bi-axial compensation film 31 and the absorbing axis of the first polarizer 41 is 90 degrees and the angle between the slow axis of the bi-axial compensation film 32 and the absorbing axis of the second polarizer 42 is 90 degrees, the central point brightness decreases and then increases in accordance with the increase of the compensation value R0 of the half wave plate 20. In addition, when the compensation value R0 of the half wave plate 20 is only half of 450 nm, that is 225 nm, the central point has a minimum brightness.

The solution 2 concludes that when the angle between the slow axis of the bi-axial compensation film 31 and the absorbing axis of the first polarizer 41 is 45 or 135 degrees and the angle between the slow axis of the bi-axial compensation film 32 and the absorbing axis of the second polarizer 42 is 45 or 135 degrees, the central point brightness decreases and then increases in accordance with the increase of the sum of the compensation value R0 of the half wave plate 20 and that of the bi-axial compensation films 31, 32. In addition, when the sum of the compensation value R0 of the half wave plate 20 and that of the bi-axial compensation films 31, 32 is only half of 450 nm, that is the compensation value R0 of the half wave plate 20 is 113 nm, the central point has the minimum brightness.

Figure 4:
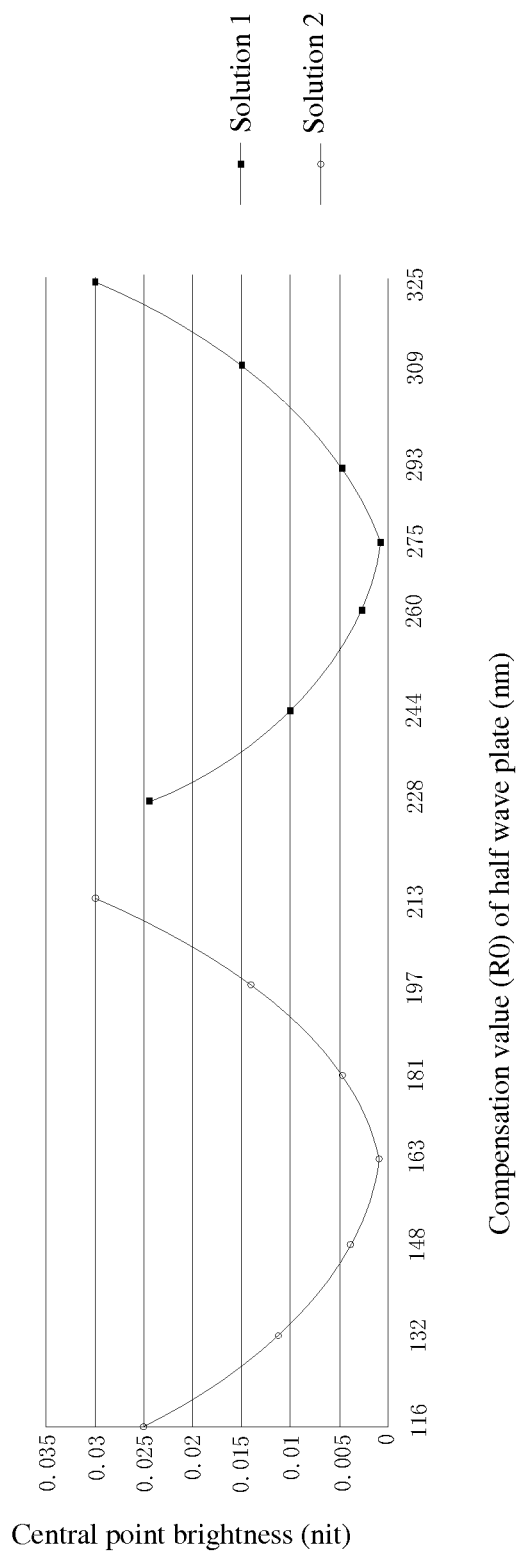
FIG. 4 is a trend view chart showing the central point brightness associated with the compensation value of the half wave plate when the wavelength equaling to 550 nm.

FIG. 4 is a trend view chart showing the central point brightness associated with the compensation value of the half wave plate when the wavelength equaling to 550 nm.

As shown in FIG. 4, solution 1 concludes that when the angle between the slow axis of the bi-axial compensation film 31 and the absorbing axis of the first polarizer 41 is 90 degrees and the angle between the slow axis of the bi-axial compensation film 32 and the absorbing axis of the second polarizer 42 is 90 degrees, the central point brightness decreases and then increases in accordance with the increase of the compensation value R0 of the half wave plate 20. In addition, when the compensation value R0 of the half wave plate 20 is only half of 550 nm, that is 275 nm, the central point has the minimum brightness.

The solution 2 concludes that when the angle between the slow axis of the bi-axial compensation film 31 and the absorbing axis of the first polarizer 41 is 45 or 135 degrees and the angle between the slow axis of the bi-axial compensation film 32 and the absorbing axis of the second polarizer 42 is 45 or 135 degree, the central point brightness decreases, and then increases in accordance with the increase of the sum of the compensation value R0 of the half wave plate 20 and that of the bi-axial compensation films 31, 32. In addition, when the sum of the compensation value R0 of the half wave plate 20 and that of the bi-axial compensation films 31, 32 is only half of 550 nm, that is the compensation value R0 of the half wave plate 20 is 163 nm, the central point has the minimum brightness.

Figure 5:
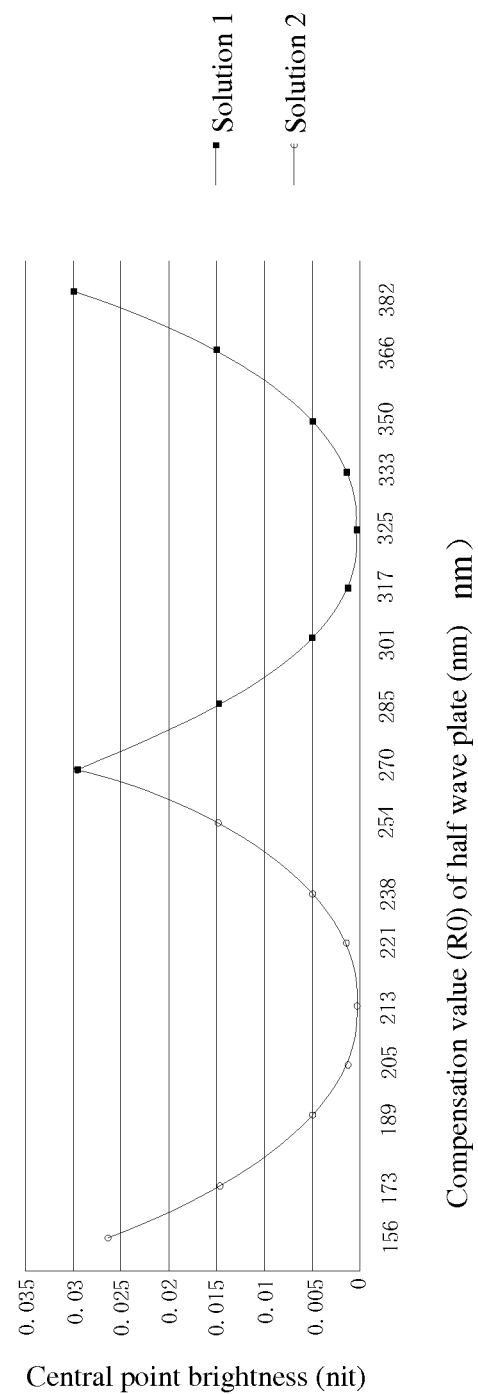
FIG. 5 is a trend view chart showing the central point brightness associated with the compensation value of the half wave plate when the wavelength equaling to 650 nm.

FIG. 5 is a trend view chart showing the central point brightness associated with the compensation value of the half wave plate when the wavelength equaling to 650 nm.

As shown in FIG. 5, solution 1 concludes that when the angle between the slow axis of the bi-axial compensation film 31 and the absorbing axis of the first polarizer 41 is 90 degrees and the angle between the slow axis of the bi-axial compensation film 32 and the absorbing axis of the second polarizer 42 is 90 degrees, the central point brightness decreases, and then increases in accordance with the increase of the compensation value R0 of the half wave plate 20. In addition, when the compensation value R0 of the half wave plate 20 is only half of 650 nm, that is 325 nm, the central point has the minimum brightness.

The solution 2 concludes that when the angle between the slow axis of the bi-axial compensation film 31 and the absorbing axis of the first polarizer 41 is 45 or 135 degrees and the angle between the slow axis of the bi-axial compensation film 32 and the absorbing axis of the second polarizer 42 is 45 or 135 degrees, the central point brightness decreases, and then increases in accordance with the increase of the sum of the compensation value R0 of the half wave plate 20 and that of the bi-axial compensation films 31, 32. In addition, when the sum of the compensation value R0 of the half wave plate 20 and that of the bi-axial compensation films 31, 32 is only half of 650 nm, that is the compensation value R0 of the half wave plate 20 is 213 nm, the central point has the minimum brightness.

It can be understood that the sum of the compensation value R0 of the half wave plate 20 and that of the bi-axial compensation films 31, 32 is configured to be, but not limited to, 112 nm The only requirement is that the above sum is only half of the predetermined wavelength.

It can be referred from the wavelength that are simulated in the above solutions, equaling to 450 nm, 550 nm and 650 nm, can be expanded to the visible light ranging from 380 nm to 780 nm.

Figure 6:
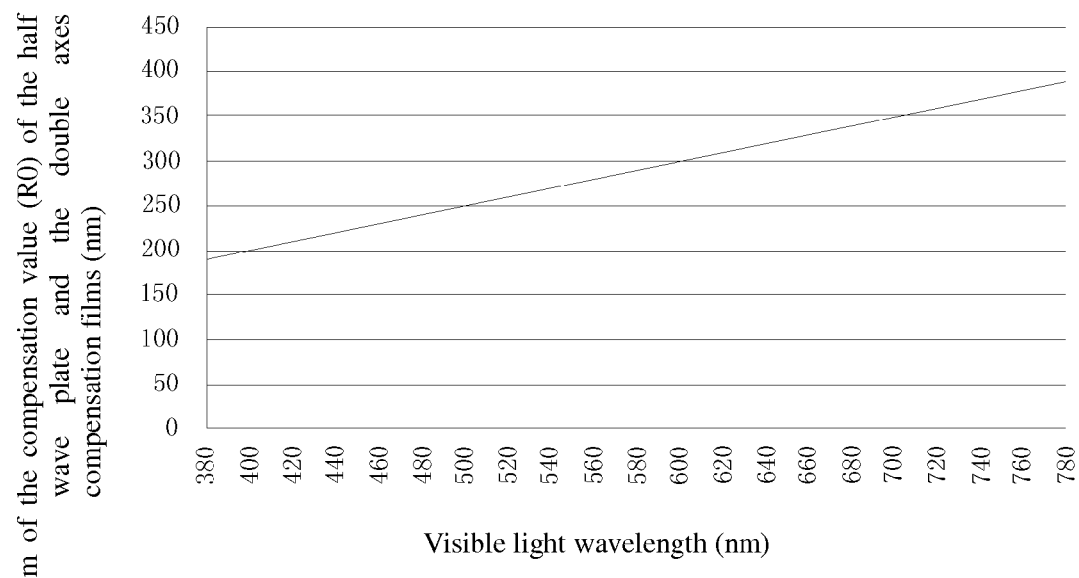
FIG. 6 is a relationship diagram illustrating the sum of the compensation value of the half wave plate and two bi-axial compensation films and the visible light wavelength.

FIG. 6 is a relationship diagram illustrating the sum of the compensation value of the half wave plate and two bi-axial compensation films and the visible light wavelength.

As shown in FIG. 6, the sum of the compensation value R0 of the half wave plate 20 and that of the bi-axial compensation films 31, 32 corresponds to half of the visible light wavelength.

Table 4 shows the simulation results of the dark-state brightness, bright-state brightness and the contrast of the liquid crystal panel in all-black state. Preferably, the angle between the slow axis of the half wave plate 20 and the absorbing axis of the first polarizer 41 is 45 or 135 degrees, the angle between the slow axis of the first bi-axial compensation film 31 and the absorbing axis of the first polarizer 41 is 45 or 135 degrees, and the angle between the slow axis of the bi-axial compensation film 32 and the absorbing axis of the second polarizer 42 is 45 or 135 degrees. The sum of the compensation value R0 of the half wave plate 20 and that of the bi-axial compensation films 31, 32 is one-half of the visible light wavelength.

TABLE 4

| 0 V LV dark-state brightness | 7 V LV bright-state brightness | contrast |
|---|---|---|
| 0.02015 | 34.618 | 1718 |

It can be seen from Table 4 that the bright-state brightness is not reduced while the dart-state brightness is greatly reduced, and the contrast is greatly enhanced. The contrast of the liquid crystal panel of the above embodiments, which is about 1718, equaling to the contrast of the conventional liquid crystal panel in Table 1.

Figure 7:
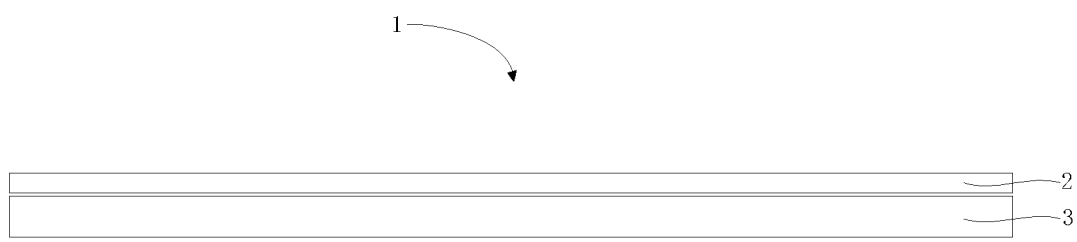
FIG. 7 is a schematic view of the liquid crystal display in accordance with one embodiment.

FIG. 7 is a schematic view of the liquid crystal display in accordance with one embodiment.

As shown in FIG. 7, the liquid crystal display 1 includes the liquid crystal panel 2 and a backlight module 3 opposite to the display panel 2. The back frame 3 supplies lights to the liquid crystal panel 2.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:
1. A liquid crystal panel, comprising:
a liquid crystal cell comprising a light incident side and a light emitting side;
a first polarizer arranged on the light incident side of the liquid crystal panel;
a second polarizer arranged on the light emitting side of the liquid crystal panel;
a half wave plate arranged between the first polarizer and the liquid crystal cell; and
wherein an absorbing axis of the first polarizer is parallel to an absorbing axis of the second polarizer and an angle between a slow axis of the half wave plate and the absorbing axis of the first polarizer is 135 degrees;
wherein the liquid crystal panel further comprises two bi-axial compensation films arranged respectively between the first polarizer and the liquid crystal cell and between the half wave plate and the liquid crystal cell; and
wherein when an angle between the slow axis of the bi-axial compensation film and an absorbing axis of the polarizer on the same side is 90 degrees, central point brightness decreases and then increases in accordance with the increase of a compensation value at a predetermined wavelength.
2. The liquid crystal panel as claimed in claim 1, wherein the central point of the liquid crystal panel has the minimum brightness when the compensation value of the half wave plate equals to half of the predetermined wavelength.

3. The liquid crystal panel as claimed in claim 1, wherein when the angle between the slow axis of the bi-axial compensation film and the absorbing axis of the polarizer on the same side is 45 degrees, a central point brightness decreases and then increases in accordance with the increase of the sum of the compensation value of the half wave plate and the compensation value of the bi-axial compensation films at a predetermined wavelength.

4. The liquid crystal panel as claimed in claim 3, wherein the central point of the liquid crystal panel has the minimum brightness when the sum of the compensation value of the half wave plate and the compensation value of the bi-axial compensation films at the predetermined wavelength equals to half of the predetermined wavelength.

5. The liquid crystal panel as claimed in claim 1, wherein when the angle between the slow axis of the bi-axial compensation film and the absorbing axis of the polarizer on the same side is 135 degrees, a central point brightness decreases and then increases in accordance with the increase of the sum of the compensation value of the half wave plate and the compensation value of the bi-axial compensation films at a predetermined wavelength.

6. The liquid crystal panel as claimed in claim 1, wherein the predetermined wavelength is of a range from 380 nm to 780 nm.

7. The liquid crystal panel as claimed in claim 6, wherein the predetermined wavelength is of a range from 450 nm 650 nm.

8. A liquid crystal display, comprising:
a liquid crystal panel and a backlight module opposite to the liquid crystal panel, the backlight module supplying light to the liquid crystal panel, and wherein the liquid crystal panel comprises:
a liquid crystal cell comprising a light incident side and a light emitting side;
a first polarizer arranged on the light incident side of the liquid crystal panel;
a second polarizer arranged on the light emitting side of the liquid crystal panel;
a half wave plate arranged between the first polarizer and the liquid crystal cell; and
wherein an absorbing axis of the first polarizer is parallel to an absorbing axis of the second polarizer and an angle between a slow axis of the half wave plate and the absorbing axis of the first polarizer is 135 degrees;
wherein the liquid crystal panel further comprises two bi-axial compensation films arranged respectively between the first polarizer and the liquid crystal cell and between the half wave plate and the liquid crystal cell; and
wherein when an angle between the slow axis of the bi-axial compensation film and an absorbing axis of the polarizer on the same side is 90 degrees, central point brightness decreases and then increases in accordance with the increase of a compensation value at a predetermined wavelength.

9. The liquid crystal display as claimed in claim 8, wherein the central point of the liquid crystal panel has the minimum brightness when the compensation value of the half wave plate equals to half of the predetermined wavelength.

10. The liquid crystal display as claimed in claim 8, wherein when the angle between the slow axis of the bi-axial compensation film and the absorbing axis of the polarizer on the same side is 45 degrees, a central point brightness decreases and then increases in accordance with the increase of the sum of the compensation value of the half wave plate and the compensation value of the bi-axial compensation films at a predetermined wavelength.

11. The liquid crystal display as claimed in claim 10, wherein the central point of the liquid crystal panel has the minimum brightness when the sum of the compensation value of the half wave plate and the compensation value of the bi-axial compensation films at the predetermined wavelength equals to half of the predetermined wavelength.

12. The liquid crystal display as claimed in claim 8, wherein when the angle between the slow axis of the bi-axial compensation film and the absorbing axis of the polarizer on the same side is 135 degrees, a central point brightness decreases and then increases in accordance with the increase of the sum of the compensation value of the half wave plate and the compensation value of the bi-axial compensation films at a predetermined wavelength.

13. The liquid crystal display as claimed in claim 8, wherein the predetermined wavelength is of a range from 380 nm to 780 nm.

14. The liquid crystal display as claimed in claim 13, wherein the predetermined wavelength is of a range from 450 nm 650 nm.

* * * * *